(12) United States Patent
Whittle et al.

(10) Patent No.: US 11,773,730 B2
(45) Date of Patent: Oct. 3, 2023

(54) CERAMIC MATRIX COMPOSITE AIRFOIL WITH HEAT TRANSFER AUGMENTATION

(71) Applicants: Rolls-Royce plc, London (GB); Rolls-Royce High Temperature Composites Inc., Cypress, CA (US)

(72) Inventors: Michael J. Whittle, Derby (GB); Steven Hillier, Manchester (GB); Stephen Harris, Cypress, CA (US); Sungbo Shim, Irvine, CA (US)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 100 days.

(21) Appl. No.: 17/508,314

(22) Filed: Oct. 22, 2021

(65) Prior Publication Data
US 2023/0130393 A1     Apr. 27, 2023

(51) Int. Cl.
| F01D 5/18 | (2006.01) |
| C04B 35/80 | (2006.01) |
| C04B 41/45 | (2006.01) |
| F01D 5/14 | (2006.01) |
| F01D 5/28 | (2006.01) |
| F01D 9/04 | (2006.01) |

(52) U.S. Cl.
CPC .............. *F01D 5/187* (2013.01); *C04B 35/80* (2013.01); *C04B 41/457* (2013.01); *F01D 5/147* (2013.01); *F01D 5/282* (2013.01); *F01D 5/284* (2013.01); *F01D 9/041* (2013.01); *C04B 2235/616* (2013.01); *F05D 2230/10* (2013.01); *F05D 2230/21* (2013.01); *F05D 2240/123* (2013.01); *F05D 2240/124* (2013.01); *F05D 2260/2212* (2013.01); *F05D 2260/232* (2013.01); *F05D 2300/6033* (2013.01)

(58) Field of Classification Search
CPC .. C04B 35/80; C04B 41/457; C04B 2235/616
See application file for complete search history.

(56) References Cited

U.S. PATENT DOCUMENTS

| 9,896,951 | B2 | 2/2018 | Walston et al. |
| 10,399,911 | B2 | 9/2019 | Shim et al. |
| 10,436,062 | B2 | 10/2019 | Propheter-Hinckley |
| 10,745,325 | B2 | 8/2020 | Shim et al. |
| 10,752,556 | B2 | 8/2020 | Shim et al. |
| 10,774,010 | B2 | 9/2020 | Shim et al. |
| 10,961,161 | B2 | 3/2021 | Kanazawa et al. |
| 11,046,620 | B2 | 6/2021 | Shim et al. |
| 11,149,553 | B2 | 10/2021 | Whittle et al. |
| 2019/0390566 | A1* | 12/2019 | Propheter-Hinckley ..................... B32B 18/00 |
| 2020/0123067 | A1* | 4/2020 | Freeman ........... C04B 35/62863 |
| 2020/0263557 | A1* | 8/2020 | Whittle .................. F01D 5/282 |

* cited by examiner

*Primary Examiner* — Erin Snelting
(74) *Attorney, Agent, or Firm* — Barnes & Thornburg LLP

(57) ABSTRACT

A turbine vane assembly adapted for use in a gas turbine engine includes a support and a turbine vane arranged around the support. The support is made of metallic materials. The turbine vane is made of ceramic matrix composite materials to insulate the metallic materials of the support.

16 Claims, 8 Drawing Sheets

CERAMIC MATRIX COMPOSITE AIRFOIL WITH HEAT TRANSFER AUGMENTATION

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A method of forming a turbine vane may comprise providing a fiber preform having a vane shape. The vane shape may include outer and inner platforms, an airfoil, and a passageway. The outer and inner platforms may be spaced apart radially from one another relative to a central reference axis to define a primary gas path therebetween. The airfoil may extend from the outer platform to the inner platform across the primary gas path. The passageway may extend radially through the outer platform, the inner platform, and the airfoil.

In some embodiments, the method may further comprise inserting a tool assembly into the passageway of the fiber preform. The tool assembly may include a plurality of radial sections. The plurality of radial sections may cooperate to define negatives of protrusions that extend into an outer surface of the tool assembly.

In some embodiments, the method may further comprise chemical vapor infiltrating the fiber preform. The fiber preform may be chemical vapor infiltrated to produce a porous preform with a plurality of protrusions in the passageway.

In some embodiments, the method may further comprise removing the tool assembly from the passageway of the porous preform. In some embodiments, the method may further comprise impregnating the porous preform with a slurry material and drying the slurry material to form a green body preform.

In some embodiments, the method may further comprise infiltrating the green body preform with a matrix material to form a ceramic matrix composite vane including a plurality of heat transfer augmentation features. The heat transfer augmentation features may be configured to increase heat transfer between the ceramic matrix composite vane and cooling air supplied to the passageway during use of the turbine vane in a gas turbine engine.

In some embodiments, the plurality of protrusions may be spaced apart radially at radial locations along the vane. In some embodiments, the plurality of protrusions may be spaced apart radially at radial locations between the outer and inner platforms along the primary gas path.

In some embodiments, the airfoil may be shaped to define a leading edge, a trailing edge, a pressure side, and a suction side. The trailing edge may be spaced apart axially from the leading edge. The suction side may be spaced apart circumferentially from the pressure side. The pressure side and the suction side may extend between and interconnect the leading edge and the trailing edge.

In some embodiments, the plurality of protrusions may be formed along at least one of the pressure side and the suction side of the airfoil. The plurality of protrusions may be located only along the pressure side of the airfoil. The plurality of protrusions may be located only along the suction side of the airfoil.

According to another aspect of the present disclosure, a method of forming a turbine vane may comprise providing a porous preform having a vane shape. The vane shape may include outer and inner platforms, an airfoil, and a passageway. The outer and inner platforms may be spaced apart radially from one another relative to a central reference axis to define a primary gas path therebetween. The airfoil may extend from the outer platform to the inner platform across the primary gas path. The passageway may extend radially through the outer platform, the inner platform, and the airfoil.

In some embodiments, the method may further comprise inserting a cast into the passageway of the porous preform. The case may be inserted into the passageway to define a space between an interior surface of the porous preform and an outer surface of the cast.

In some embodiments, the method may further comprise depositing a slurry material into the space between the porous preform and the cast in the passageway. The slurry material may be deposited to form a surface layer having a plurality of protrusions that extend from the porous preform into the passageway.

In some embodiments, the method may further comprise drying the slurry material to form a green body preform. In some embodiments, the method may further comprise removing the cast from the passageway of the green body preform.

In some embodiments, the method may further comprise infiltrating the green body preform with a matrix material to form a ceramic matrix composite vane including a plurality of heat transfer augmentation features. The heat transfer augmentation features may be configured to increase heat transfer between the ceramic matrix composite vane and cooling air supplied to the passageway during use of the turbine vane in a gas turbine engine. In some embodiments, the plurality of protrusions may be spaced apart radially at radial locations between the outer and inner platforms along the primary gas path.

In some embodiments, the airfoil may be shaped to define a leading edge, a trailing edge spaced apart axially from the leading edge, a pressure side, and a suction side spaced apart circumferentially from the pressure side. The pressure side and the suction side may extend between and interconnect the leading edge and the trailing edge.

In some embodiments, the plurality of protrusions may be formed along at least one of the pressure side and the suction side of the airfoil. The plurality of protrusions may be located only along the pressure side of the airfoil. The plurality of protrusions may be located only along the suction side of the airfoil.

In some embodiments, the method may further comprise machining the ceramic matrix composite vane after the infiltrating with the matrix material. The ceramic matrix composite vane may be machined after the infiltration to define a desired shape of the plurality of heat transfer augmentation features.

According to another aspect of the present disclosure, a turbine vane assembly adapted for use in a gas turbine engine may include a vane and a a spar. The vane may be made of ceramic matrix composite materials. The spar may be made of metallic materials.

In some embodiments, the vane may include an outer platform, an inner platform, and an airfoil. The inner platform may be spaced apart radially from the outer platform relative to a central reference axis to define a primary gas path therebetween. The airfoil may extend from the outer platform to the inner platform across the primary gas path.

In some embodiments, the spar may be spaced from the airfoil of the vane at all radial locations across the primary gas path such that a gap is maintained between the vane and the spar across the primary gas path. The spar may include a mount panel and a rod. The mount panel may be engaged with the vane at at least one location radially spaced from the primary gas path to receive aerodynamic loads from the vane. The rod may extend radially from the mount panel through a radially-extending passageway formed by an interior surface of the airfoil of the vane across the primary gas path.

In some embodiments, the vane may be formed to include a plurality of heat transfer augmentation features. The heat transfer augmentation features may be arranged at radial locations between the outer and inner platforms along the primary gas path. Each of the plurality of heat transfer augmentation features may extend from the interior surface of the airfoil in the passageway toward the spar. The features may be configured to increase heat transfer between the ceramic matrix composite vane and cooling air supplied to the passageway during use of the vane in the gas turbine engine while avoiding conductive heat transfer from the ceramic matrix composite materials of the vane to the metallic materials of the spar that would be caused by contact between the vane and the spar across the primary gas path.

These and other features of the present disclosure will become more apparent from the following description of the illustrative embodiments.

DETAILED DESCRIPTION OF THE DRAWINGS

Figure 1:
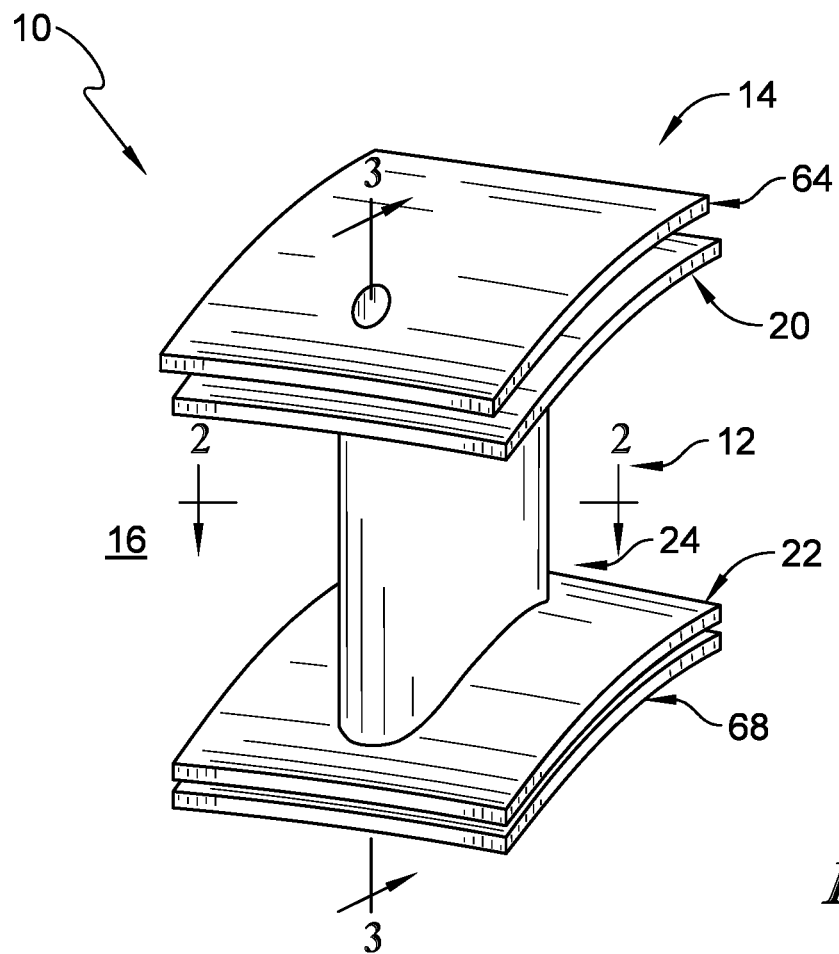
FIG. 1 is a perspective view of a turbine vane assembly in accordance with the present disclosure showing the turbine vane assembly includes a metallic spar and a ceramic matrix composite vane arranged around the spar.

For the purposes of promoting an understanding of the principles of the disclosure, reference will now be made to a number of illustrative embodiments illustrated in the drawings and specific language will be used to describe the same.

An illustrative turbine vane assembly 10 adapted for use in a gas turbine engine is shown in FIG. 1. The turbine vane assembly 10 includes a vane 12 and a spar 14 as shown in FIGS. 1-5. The vane 12 is made of ceramic matrix composite materials, while the spar 14 is made of metallic materials. The spar 14 provides structural support for the turbine vane assembly 10 and may be adapted for mounting in a ring or to a turbine case.

The vane 12 defines a primary gas path 16 adapted to conduct hot gases during use of the turbine vane assembly 10 in the gas turbine engine. At least a portion of the spar 14 extends through a radially-extending passageway 25 formed in the vane 12 so that the vane 12 is arranged around a portion of the spar 14. In this way, the vane 12 insulates the metallic materials of the spar 14 from high temperatures in the primary gas path 16 defined through the turbine vane assembly 10. The spar 14 is spaced from the vane 12 at all radial locations across the primary gas path 16 such that a gap 18 is maintained between the vane 12 and the spar 14 across the primary gas path 16.

Cooling air may be supplied to the gap 18 between the vane 12 and the spar 14 to cool the components. In the illustrative embodiment, the vane 12 is formed with heat transfer augmentation features 54 that encourage cooling between the vane 12 and the metallic spar 14 components adjacent to hot components of the vane 12 in the gap 18. These heat transfer augmentation features 54 can include protrusions 54 (pins/fins), flow separators, and other features that drive turbulence in cooling air moving between the vane 12 and the spar 14 in the gap 18 so that more heat can be withdrawn by the air as it moves therebetween.

Figure 4:
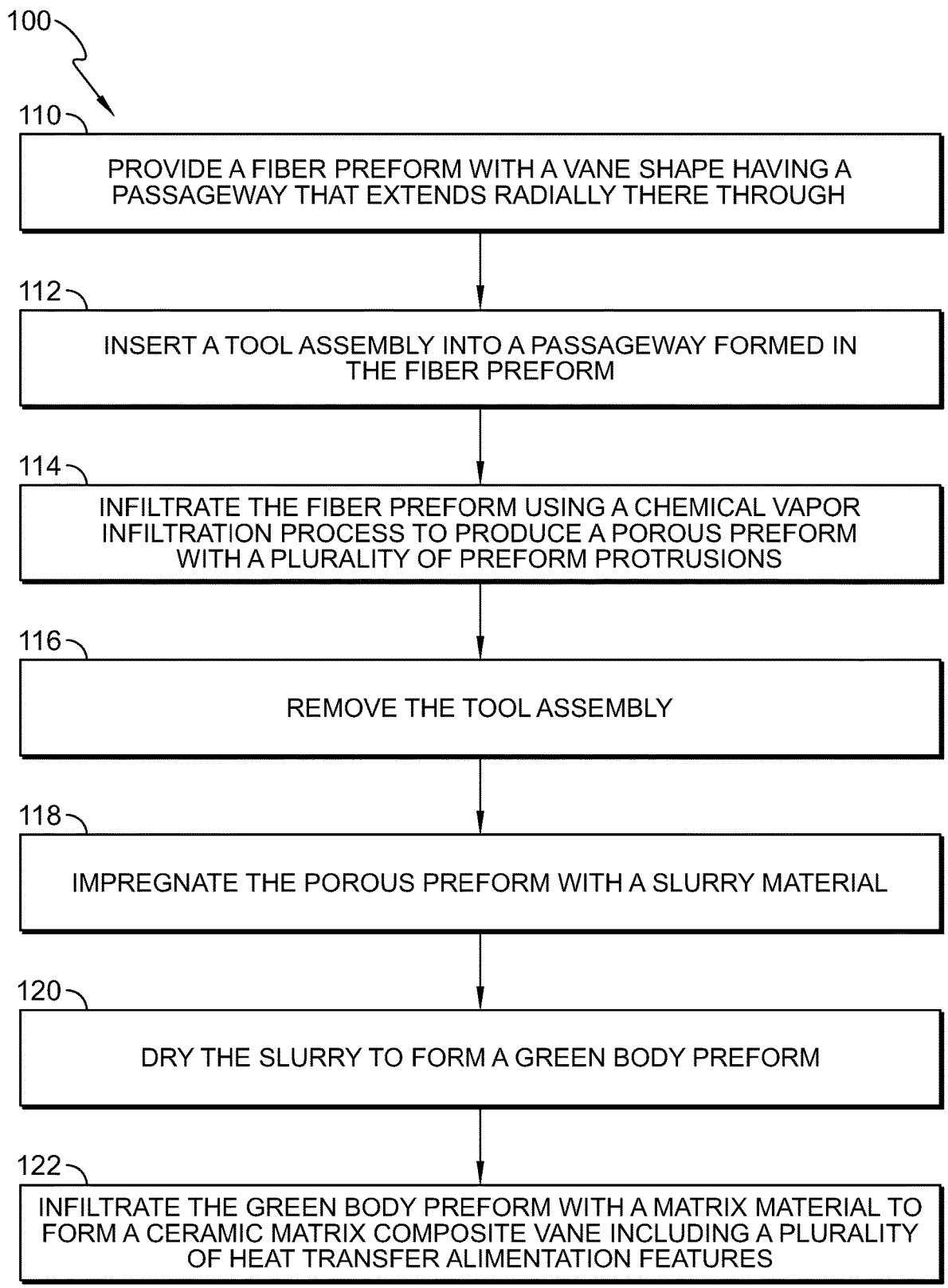
FIG. 4 is a diagrammatic view of a method of forming the ceramic matrix composite vane with the plurality of heat transfer augmentation features showing the method includes using a tool assembly to produce a porous preform with a plurality of preform protrusions that will form the heat transfer augmentation features.
Figure 5:
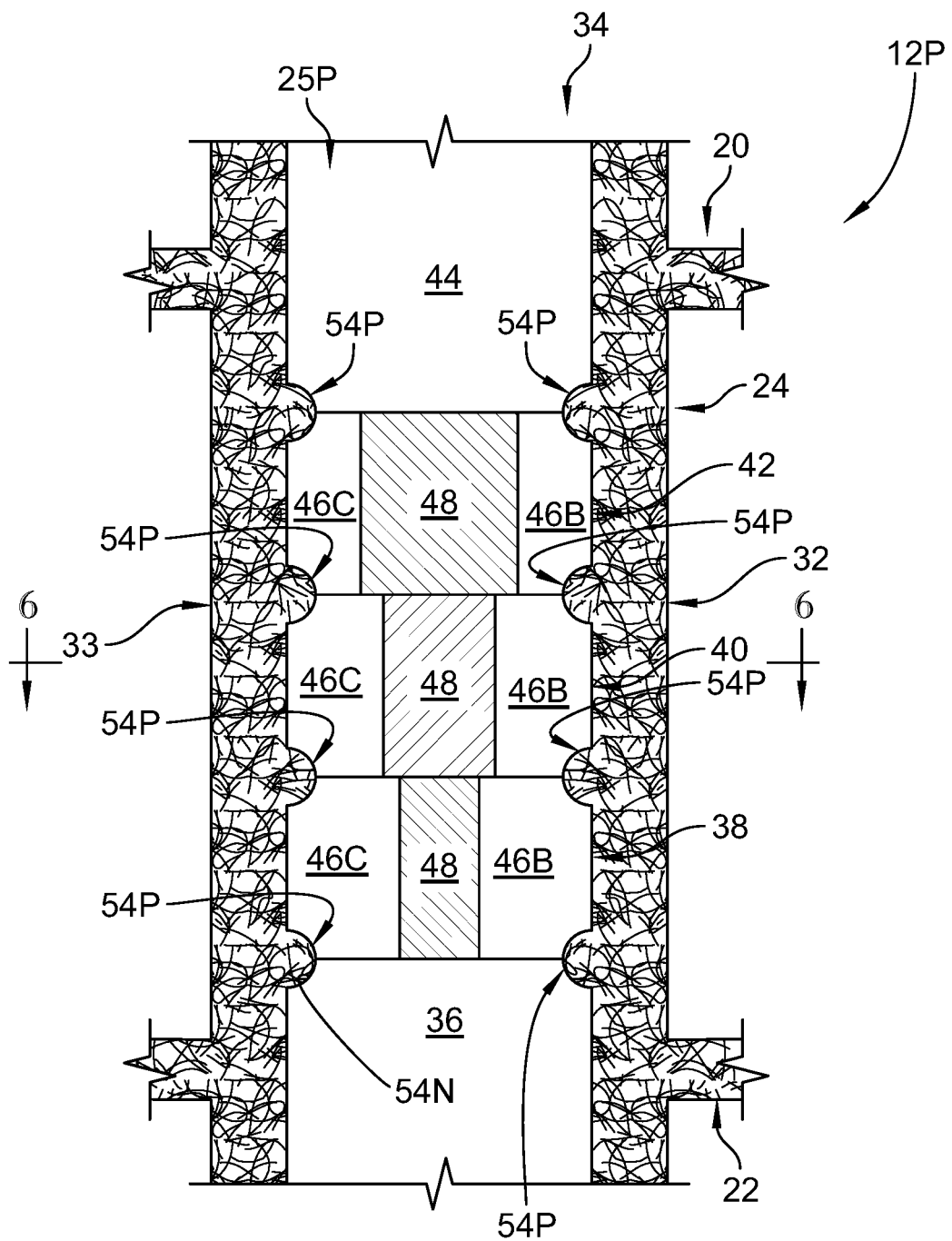
FIG. 5 is a cross sectional view of the porous preform with the plurality of preform protrusions formed using the tool assembly, and showing the tool assembly includes a plurality of radial sections that cooperate to define negatives of the plurality of preform protrusions.

A method 100 of forming the ceramic matrix composite vane 12 with the heat transfer augmentation features 54 may include several steps. First, the method 100 includes providing a fiber preform (not shown) as suggested by box 110. The fiber preform may have a vane shape that includes an outer platform 20, an inner platform 22, and an airfoil 24 as shown in FIGS. 1, 4, and 5. The outer and inner platforms 20, 22 are spaced apart radially from one another relative to a central reference axis 11 to define the primary gas path 16 therebetween. The airfoil 24 extends from the outer platform 20 to the inner platform 22 across the primary gas path 16.

The outer platform 20 defines a radially outer boundary of the primary gas path 16 and the inner platform 22 defines a radially inner boundary of the primary gas path 16. The outer platform 20 also shields an outer mount panel 64 of the spar 14 from the primary gas path 16 and the inner platform 22 shields an inner mount panel 68 of the spar 14 from the primary gas path 16. The airfoil 24 is shaped to redirect air flowing through the gas turbine engine and shield a rod 66 of the spar 14 from the primary gas path 16.

In some embodiments, the vane shape of the fiber preform may only be the airfoil 24. The outer and inner platforms 20, 22 may be formed separately and assembled with the airfoil 24 later in the process. In the illustrative embodiment, the fiber preform is formed to define a passageway. The passageway extends radially through the airfoil 24.

The fiber preform is then infiltrated using a chemical vapor infiltration process to form a porous preform 12P with a plurality of preform protrusions 54P. To begin forming the porous preform 12P, the method 100 includes inserting a tool assembly 34 into the passageway 25P formed in the fiber preform as suggested by box 112 as shown in FIG. 4. The tool assembly 34 is used to define a mold surface to form the plurality of perform protrusions 54P.

Figure 6:
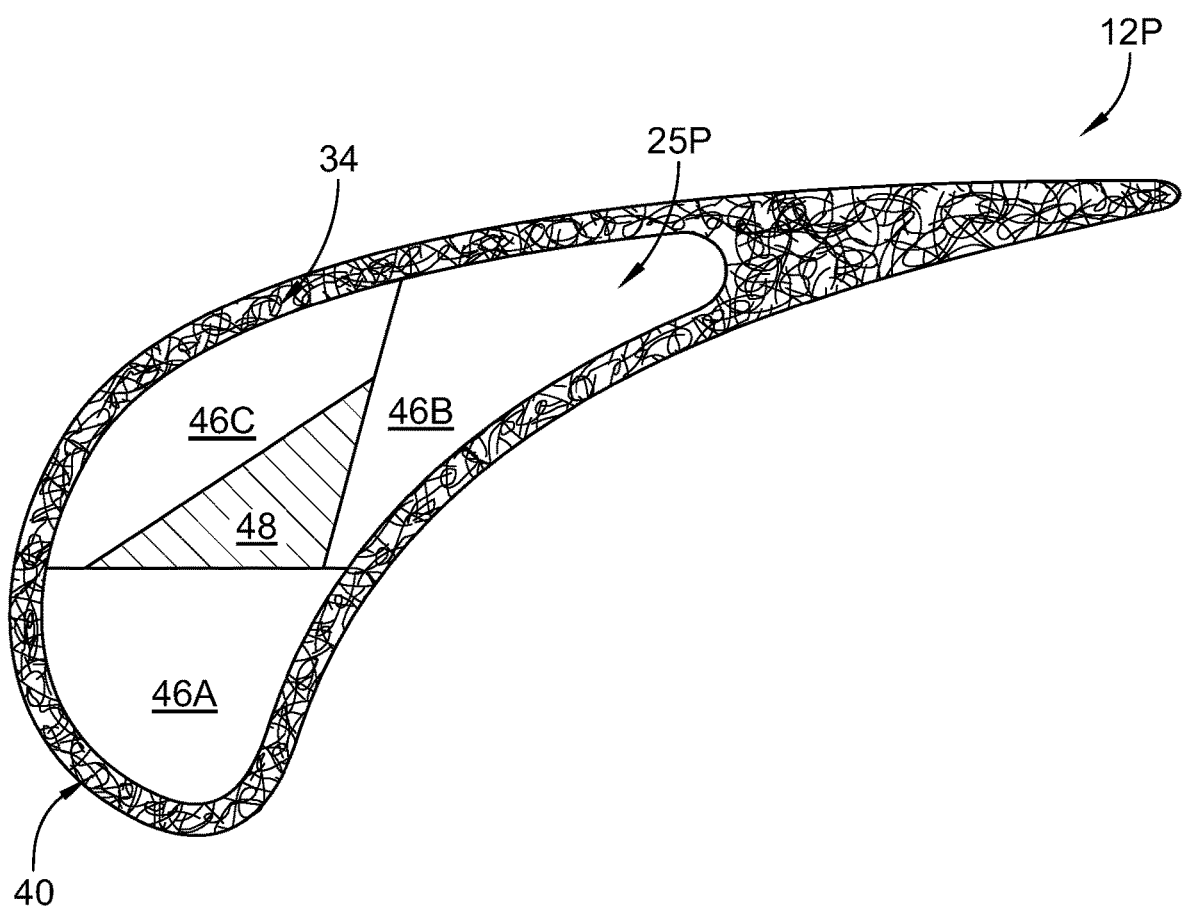
FIG. 6 is a cross sectional view of the porous preform and the tool assembly of FIG. 5 showing each radial section of the tool assembly includes different tool pieces and a core piece that are assembled together to form the corresponding section.

In the illustrative embodiment, the tool assembly 34 includes a plurality of radial sections 36, 38, 40, 42, 44 as shown in FIGS. 5 and 6. In the illustrative embodiment, the different sections 36, 38, 40, 42 of the tool assembly 34 cooperate to define a negative 54N of the protrusions 54P.

Some of the different radial sections 38, 40, 42 may include different tool pieces 46A, 46B, 46C and a core piece 48 that are assembled together to form that section 36, 38, 40 as shown in FIGS. 5 and 6. The tool pieces 46A, 46B, 46C confront the fiber preform in the passageway 25P, while the core piece 48 is located in a center hole formed by the tool pieces 46A, 46B, 46C.

The location and arrangement of the protrusions 54 may be optimized to increase cooling in predetermined specific locations between the vane 12 and the spar 14. The different sections 36, 38, 40, 42 of the tool assembly 34 are shaped to form the preform protrusions 54P in those predetermined specific locations in the passageway 25P. The different sections 36, 38, 40, 42, 44 may be optimized or altered to change the locations of the protrusions 54.

In the illustrative embodiment, the shape of the tool assembly 34 is configured to form preform protrusions 54P that are spaced apart radially along the radial length of the passageway 25P as shown in FIG. 5. Adjacent sections 36, 38 define a first set of protrusions 54P at one radial location. Adjacent sections 38, 40 define a second set of protrusions 54P at another radial location spaced apart from the first set of protrusions 54P. Adjacent sections 40, 42 define a second set of protrusions 54P at another radial location spaced apart from the first and second sets of protrusions 54P.

Figure 2:
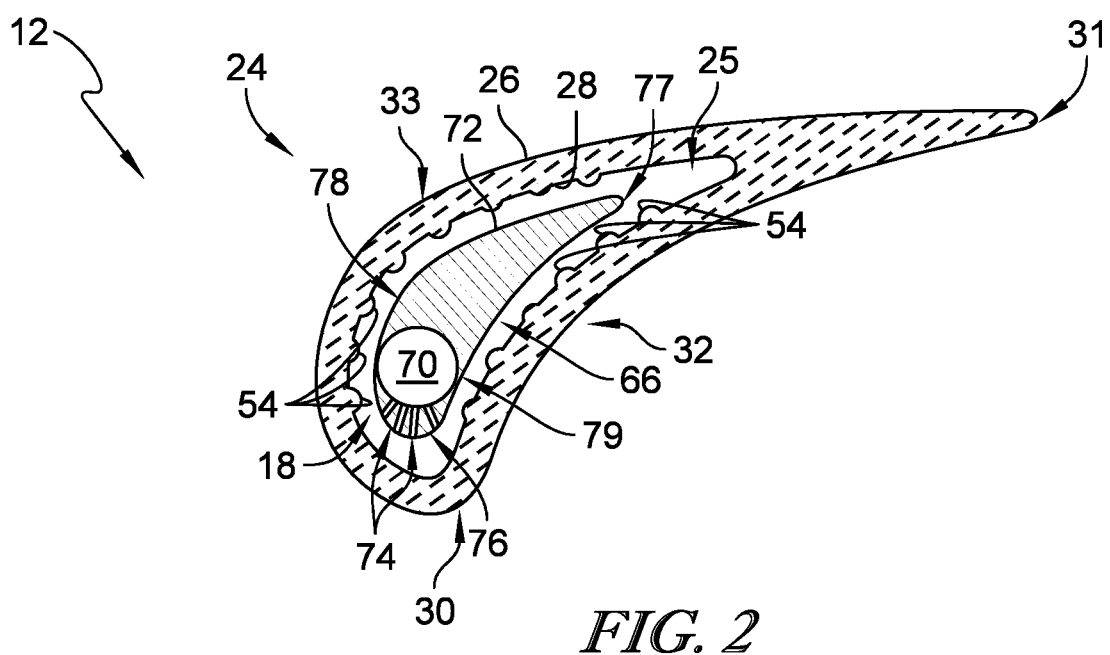
FIG. 2 is a cross sectional view of the turbine vane assembly of FIG. 1 taken along line 2-2 showing that the vane has an outer surface, an inner surface that defines a passageway through which the spar extends, and a plurality of heat transfer augmentation features are arranged on the inner surface of the vane facing the spar.

The shape of the tool assembly 34 is also configured to form protrusions 54 that are spaced apart along the chord length of the vane 12. In the illustrative embodiment, the protrusions 54 are spaced apart along the chord length of the vane 12 starting at a point spaced apart from a leading edge 30 of the vane 12 in the passageway 25 as shown in FIG. 2.

In some embodiments, the shape of the tool assembly 34 is configured to form protrusions 54 that are localized in radial and chordal locations of the vane 12 in the passageway 25. In other words, the shape of the tool assembly 34 defines the negative 54N of the protrusions 54 at different radial and chordal locations in the passageway 25. The radial and chordal locations of the protrusions 54 may be based on the need to increase the heat transfer in specific locations in the passageway 25.

In the illustrative embodiment, the shape of the tool assembly 34 is configured to form protrusions 54 along the pressure and suction sides 32, 33 of the airfoil 24 facing the sides 78, 79 of a rod 66 included in the spar 14. In other embodiments, the shape of the tool assembly 34 is configured to form protrusions 54 only along the pressure side 32 of the airfoil 24 facing the side 79 of the rod 66. In other embodiments, the shape of the tool assembly 34 is configured to form protrusions 54 only along the suction side 33 of the airfoil 24 facing the side 78 of the rod 66.

In some embodiments, the shape of the tool assembly 34 is configured to exponentially decrease the spacing between each of the plurality of protrusions 54 moving along the chord length of the airfoil 24 from the leading edge 30 to the trailing edge 31 of the airfoil 24. In other embodiments, the shape of the tool assembly 34 is configured to locate the protrusions in discreet spaced-apart, increased-frequency patches over interior surface 28 of the vane 12 to increase heat transfer at predetermined locations associated with expected hot spots on either the airfoil 24 or the spar 14.

Figure 11:
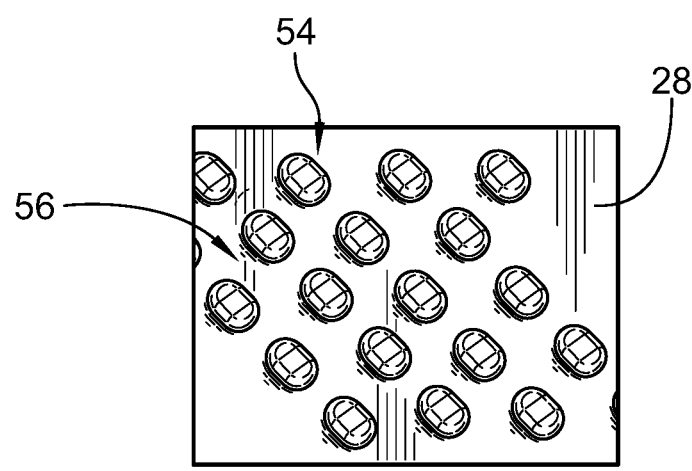
FIG. 11 is a detail view of the heat transfer augmentation features of FIG. 3 showing that the protrusions can have a circular cross sectional shape.

In some embodiments, the shape of the tool assembly 34 is configured to produce protrusions with different shapes. In some embodiments, the protrusions 54 have an oblong cross-sectional shape as shown in FIG. 11. In other embodiments, the protrusions 54 have a circular cross-sectional shape as shown in FIG. 11.

In other embodiments, the protrusions 54 may have any other suitable shape. In some embodiments, the shape of the tool assembly 34 is configured to produce protrusions 54 with different shapes at different locations of the vane 12.

With the tool assembly 34 in place, the method 100 includes chemical vapor infiltrating the fiber preform to form the porous preform 12P as suggested by box 114. In FIG. 5, the porous preform 12P is shown after the chemical vapor infiltrations process with the tool assembly 34 still in place in the passageway 25P.

Once the porous preform 12P is formed, the tool assembly 34 may be removed out of the passageway 25P as suggested by box 116. The tool assembly 34 may be removed by disassembling the different sections 36, 38, 40, 42, 44 of the tool assembly 34. For example, the core piece 48 is removed first to allow the other tool pieces 46A, 46B, 46C to be removed.

Next, the method 100 includes impregnating the porous preform 12P with a slurry material as suggested by box 118. The slurry is allowed to dry to form a green body preform (not shown) as suggested by box 120.

Then, the method 100 includes infiltrating the green body preform with a matrix material as suggested by box 122. As a result, the platforms 20, 22, the airfoil 24, and the heat transfer augmentation features 54 of the vane 12 are integrally formed from ceramic matrix composite materials such that the platforms 20, 22, the airfoil 24, and the heat transfer augmentation features 54 are included in a one-piece vane component 12 as shown in FIGS. 1 and 2.

In some embodiments, the method 100 may include machining the component 12 after the infiltration step. The component 12 may be machined to remove some of the material from the passageway 25 to form the desired shape of the protrusions 54.

The heat transfer augmentation features 54 are configured to increase heat transfer between the ceramic matrix composite vane 12 and cooling air supplied to the passageway 25 during use of the vane 12 in the gas turbine engine. Each of the heat transfer augmentation features 54 extend circumferentially away from an interior surface 28 of the airfoil 24 that defines the passageway 25. In the illustrative embodiment, the resulting heat transfer features 54 comprise SiC fibers.

In the illustrative embodiment, the plurality of heat transfer augmentation features 54 are located along the pressure and suction sides 32, 33 of the airfoil 24 facing the sides 78, 79 of a rod 66 included in the spar 14. In other embodiments, the features 54 are located only along the pressure side 32 of the airfoil 24 facing the side 79 of the rod 66. In other embodiments, the features 54 are located only along the suction side 33 of the airfoil 24 facing the side 78 of the rod 66.

In some embodiments, the spacing between each of the plurality of heat transfer augmentation features 54 exponentially decreases moving along the chord length of the airfoil 24 from the leading edge 30 to the trailing edge 31 of the airfoil 24. In other embodiments, the features 54 are located in discreet spaced-apart, increased-frequency patches over interior surface 28 of the vane 12 to increase heat transfer at predetermined locations associated with expected hot spots on either the airfoil 24 or the spar 14.

Figure 10:
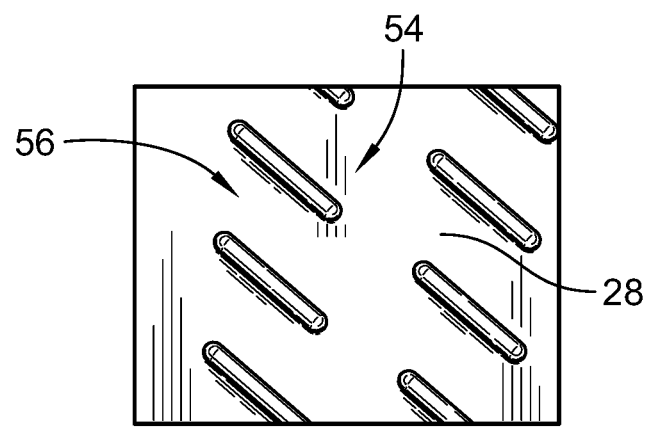
FIG. 10 is a detail view of the heat transfer augmentation features of FIG. 3 showing that the protrusions can have an long ovular cross sectional shape.

In the illustrative embodiments, the protrusions 54 are arranged so as to form flow channels 56 as suggested in FIGS. 10 and 11. The flow channels 56 direct the cooling air axially aft, while preventing mixing between the channels 56.

In the illustrative embodiments, the protrusions 54 are sized so as to not contract the spar 14 in the passageway 25 of the airfoil 24. This reduces the conductive heat transfer between the ceramic matrix composite materials of the vane 12 to the metallic materials of the spar 14 that would be caused by contact between the vane 12 and the spar 14 across the primary gas path 16.

In some embodiments, the heat transfer augmentation features 54 may be plurality of flow separators instead of protrusions. The flow separators may extend circumferentially away from the interior surface 28 of the airfoil 24 and extend axially along the chord length of the airfoil 24 from the leading edge 30 to the trailing edge 31 of the airfoil 24 on the suction side 33 and/or the pressure side 32 of the airfoil 24. The flow separators may be radially spaced apart from one another along the radial length of the airfoil 24 to measure and segregate the flow of cooling air at multiple radial heights along the radial length of the airfoil 24. In other embodiments, only one flow separator may be located in the gap 18.

In some embodiments, the heat transfer augmentation features 54 may be plurality of depressions instead of protrusions. The plurality of depressions may extend inwardly into the interior surface 28 of the airfoil 24. The plurality of depressions may be located along the sides 32, 33 of the airfoil 24 facing both the pressure side 79 and the suction side 78 of the rod 66. In other embodiments, the depressions may be located only along the side 32 of the airfoil 24 facing the pressure side 79 of the rod 66. In other embodiments, the depressions may be located only along the side 33 of the airfoil 24 facing the suction side 78 of the rod 66.

Similar to the protrusions, the spacing between each of the plurality of depressions may exponentially decrease moving along the chord length of the airfoil 24 from the leading edge 30 to the trailing edge 31 of the airfoil 24. In other embodiments, the depressions may be located in discreet spaced-apart, increased-frequency patches over the airfoil 24 in the passageway 25 to increase heat transfer at predetermined locations associated with expected hot spots.

Turning again to the fully formed vane 12, the airfoil 24 includes an outer surface 26 and the interior surface 28 as shown in FIG. 2. The outer surface 26 faces the primary gas path 16 and extends between the outer platform 20 and the inner platform 22. The interior surface 28 is spaced apart from the outer surface 26 and defines the radially-extending passageway 25 that extends radially through the airfoil 24.

The outer surface 26 of the airfoil 24 defines the leading edge 30, the trailing edge 31, the pressure side 32, and the suction side 33 as shown in FIG. 2. The trailing edge 31 is axially spaced apart from the leading edge 30. The suction side 33 is circumferentially spaced apart from the pressure side 32. The pressure side 32 and the suction side 33 extend between and interconnect the leading edge 30 and the trailing edge 31.

Figure 3:
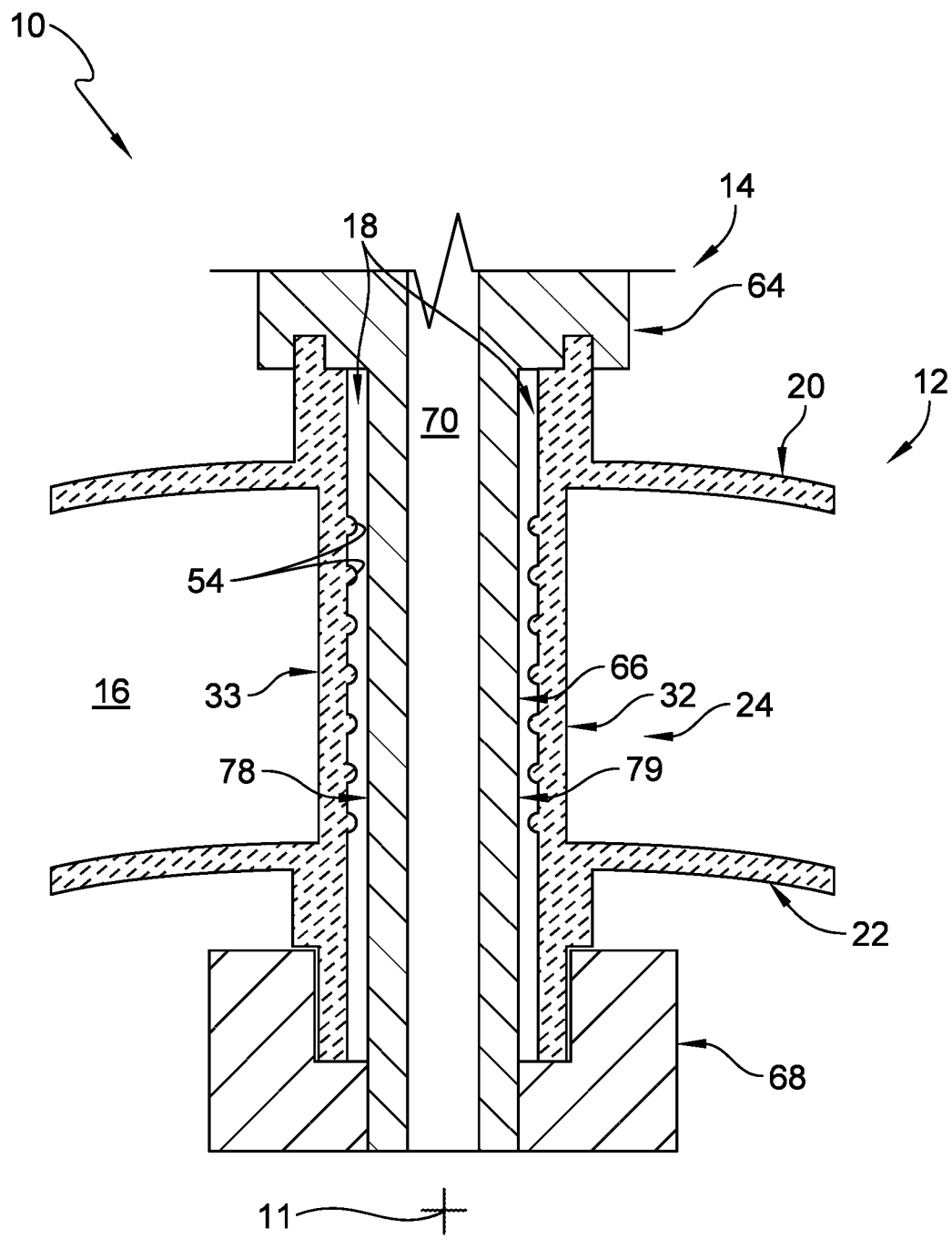
FIG. 3 is a cross sectional view of the turbine vane assembly of FIG. 1 taken along line 3-3 showing that the heat transfer augmentation features extend radially along the length of the vane from an outer platform to an inner platform of the vane.

The spar 14 includes an outer mount panel 64, a rod 66, and an inner mount panel 68 as shown in FIGS. 1-3. The outer mount panel 64 is engaged with the vane 12 at least one location radially spaced from the primary gas path 16 to receive aerodynamic loads from the vane 12. The inner mount panel 68 is spaced radially inward from the outer mount panel 64 relative to the axis 11. The rod 66 extends radially inward from the outer mount panel 64 through the radially-extending passageway 25 formed by the airfoil 24 of the vane 12 across the primary gas path 16 and couples to the inner mount panel 68.

The spar 14 further includes a cooling air conduit 70 as shown in FIGS. 2 and 3. The cooling air conduit 70 extends from outside the primary gas path into the outer mount panel 64 and the rod 66 and receives cooling air from a cooling air source.

The rod 66 includes an outermost surface 72 and the cooling air holes 74 as shown in FIGS. 2-4. The outermost surface 72 faces the interior surface 28 of the airfoil 24 and is spaced apart from the airfoil 24 at all locations radially between the outer platform 20 and the inner platform 22 to define the gap 18 between the metallic spar 14 and the airfoil 24. The cooling air holes 74 are sized to discharge cooling air from the cooling air conduit 70 into the gap 18 between the vane 12 and the spar 14 along the primary gas path 16.

The cooling air holes 74 are fluidly connected to the cooling air conduit 70 and are arranged to discharge cooling air toward the leading edge 30 of the airfoil 24 included in the vane 12 to provide some cooling to the vane 12.

The heat transfer augmentation features 54 are configured to induce turbulence in cooling air supplied to the gap 18 between the vane 12 and the spar 14 across the primary gas path 16 during use of the turbine vane 10. In this way, heat is more effectively transferred from the vane 12 to the cooling air while avoiding conductive heat transfer from the ceramic matrix composite materials of the vane 12 to the metallic materials of the spar 14 that would be caused by contact between the vane 12 and the spar 14 across the primary gas path 16.

The outermost surface 72 of the rod 66 is shaped to form a leading edge 76, a trailing edge 77, a suction side 78, and a pressure side 79 as shown in FIG. 2. The trailing edge 77 of the rod 66 is axially spaced apart from the leading edge 76 of the rod 66. The suction side 78 of the rod 66 is circumferentially spaced apart from the pressure side 79 of the rod. The suction side 78 and the pressure side 79 of the rod 66 extend between and interconnect the leading edge 76 and the trailing edge 77 of the rod 66. In the illustrative embodiment, the outermost surface 72 of the rod 66 is airfoil shaped and the rod 66 has a chord length. Additionally, the cooling air conduit 70 is formed in the rod 66 toward the leading edge 76 of the rod 66.

Figure 7:
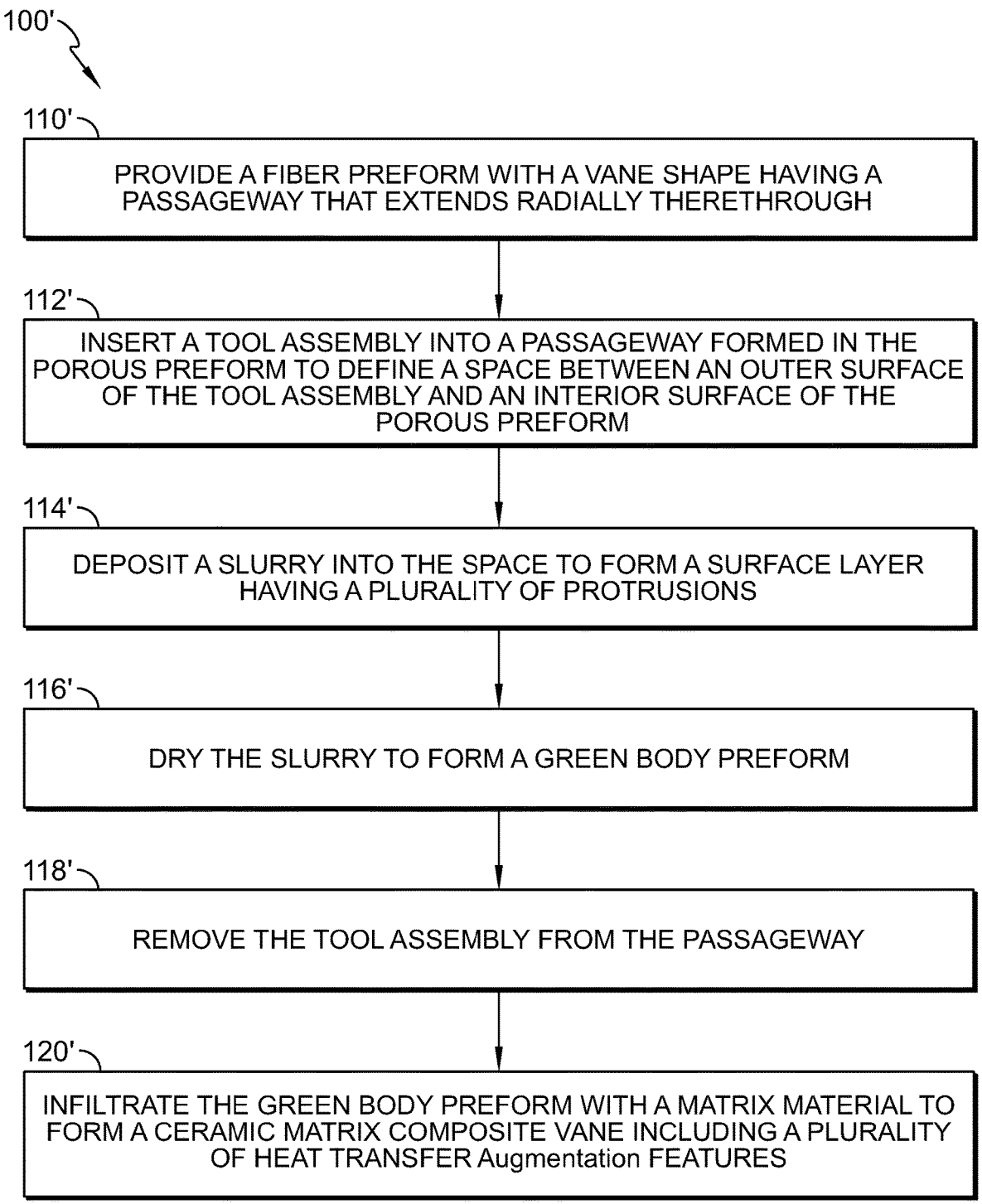
FIG. 7 is a diagrammatic view of another method of forming the ceramic matrix composite vane with the plurality of heat transfer augmentation features showing the method includes forming a plurality of protrusions by depositing a slurry material on an interior surface of a porous preform.

Another method 100' of forming the ceramic matrix composite vane 12 with the heat transfer augmentation features 54 is shown in FIG. 7. The method 100' is substantially similar to the method 100 shown in FIG. 4; however, the protrusions 54 formed using the method 100 comprise fibers, while the protrusions 254G formed using the method 100' do not contain any fibers. Instead, the protrusions 254G are formed from the slurry material.

The method 100' begins by providing a porous preform 212P having a vane shape as suggested by box 110'. The vane shape includes an airfoil 224 as shown in FIG. 7.

The porous preform 212P is formed using a simple tool assembly compared to the tool assembly 34 so that the passageway 225P does not contain any preform protrusions like in the embodiment of FIG. 4. In the illustrative embodiment, the porous preform 212P also includes an exterior surface 226P and an interior surface 228P. The exterior surface 226P faces the gas path 16, while the interior surface 228P defines the passageway 225P. The passageway 225P extends radially through the airfoil 224.

Once the porous preform 212P of the vane is provided, the method includes inserting another tool assembly 234 into the passageway 225P of the vane porous preform 212P as suggested by box 112'. The tool assembly 234, or cast 234, may be similar to the tool assembly 34 in the embodiment of FIGS. 5 and 6.

The tool assembly 234 is inserted into the passageway 225P by assembling the tool assembly 234 in the passageway 225P in the illustrative embodiment. The tool assembly 234 is spaced apart from the preform 212P at certain areas in the passageway 225P to define a space 219 between an outer surface 234S of the tool assembly and the interior surface 228P of the porous preform 212P.

The shape of the tool assembly 234 effects the formation of the plurality of heat transfer augmentation features 254G that extend from the interior surface 228P into the gap. In the illustrative embodiment, the tool assembly 234 defines a negative 254N of the plurality of heat transfer augmentation features 254G. The plurality of protrusions 254G are sized so that once the spar is in place, the protrusions 254G are spaced apart from the outermost surface of the spar in the passageway 225P in the illustrative embodiment.

The shape of the tool assembly 234 may be optimized so that the plurality of heat transfer features 254G are only in specific locations in the passageway 225P. In the illustrative embodiment, the shape of the tool assembly 34 is configured to form protrusions 254G that are spaced apart radially along the radial length of the passageway 225P of the vane in the primary gas path and along the chord length of the vane starting at a point spaced apart from a leading edge 230 of the vane in the passageway 225P. In some embodiment, the shape of the tool assembly 234 is configured to form protrusions 254G that are localized in radial and chordal locations of the vane in the passageway 225P.

In the illustrative embodiment, the plurality of protrusions 254G are located along the pressure and suction sides 232, 233 of the airfoil 224 so that the protrusions 254G would face the spar. In other embodiments, the protrusions 254G are located only along the pressure side 232 of the airfoil 224 in the passageway 225P. In other embodiments, the protrusions 254G are located only along the suction side 233 of the airfoil 224 in the passageway 225P.

In some embodiments, the spacing between each of the plurality of protrusions 254G exponentially decreases moving along the chord length of the airfoil 224 from the leading edge 230 to the trailing edge 231 of the airfoil 224. In other embodiments, the protrusions are located in discreet spaced-apart, increased-frequency patches over interior surface 228P to increase heat transfer at predetermined locations associated with expected hot spots on either the airfoil 224 or the spar.

In some embodiments, the shape of the plurality of heat transfer features 254G may be different at different locations. In some embodiments, the protrusions 254G have an oblong cross-sectional shape like the protrusions 54 in FIG. 8. In other embodiments, the protrusions 254G have a circular cross-sectional shape like the protrusions 54 in FIG. 11. In other embodiments, the protrusions 254G may have any other suitable shape.

With the tool assembly 234 in place in the passageway 225P, a slurry is then deposited into the space 219 between the porous preform 212P and the tool assembly 234 in the passageway 225P to form a surface layer 250 as suggested by box 114'. The surface layer 250 has the plurality of protrusions 254G that will form the augmentation features of the vane.

After the slurry is deposited to form the surface layer 250, the slurry is dried to form a green body preform 212G with a plurality of protrusions 254G as suggested by box 116'. The green body preform 212G is then infiltrated with a matrix material to form the ceramic matrix composite vane like the vane 12 shown in FIG. 1 with integrally formed heat transfer features 54. Once the slurry is dried, the tool assembly 234 may be removed out of the passageway 225P as suggested by box 118' in FIG. 7. Then, the method 100' includes infiltrating the green body preform with a matrix material as suggested by box 120'.

In some embodiments, the porous preform 212P may be impregnated with a first slurry material and allowed to dry before the tool assembly 234 is inserted. Then, the tool assembly 234 may be inserted into the passageway 225P so that a second slurry material may be deposited into the space 219. The resulting surface layer 250 is then formed on a surface of the impregnated porous preform to produce the plurality of protrusions 254G.

In some embodiments, the method 100' may include machining the surface layer 250 after the infiltration step to remove some of the surface layer to form the desired shape of the heat transfer augmentation features.

The present disclosure relates to a turbine vane assembly 10 with increased heat transfer coefficient within the ceramic matrix composite (CMC) internal cavity, or passageway 25 of the airfoil 24. The increased heat transfer coefficient also increases the cooling effectiveness and reduces the CMC temperature without consuming additional cooling flows.

In many metallic vanes designs, the metallic vanes do not need sparred supports, and therefore do not require CMC cooling. However, the CMC cooling requirements will depend on their material temperature capability and engine cycle design. In some embodiments, the spar 14 may be coated in a low conductivity thermal barrier coating to reduce heat transfer. In other embodiments, the spar 14 may be made of a capable material on the external surface.

The turbine vane 10 may be configured to support other gas turbine engine components, such as an inter-stage seal. Accordingly, an application of cooling flows may be used to maintain an acceptable temperature between the turbine vane assembly 10 components 12, 14 so that the structural strength of the materials is maintained and may support the other gas turbine engine components, such as the inter-stage seal.

Figure 8:
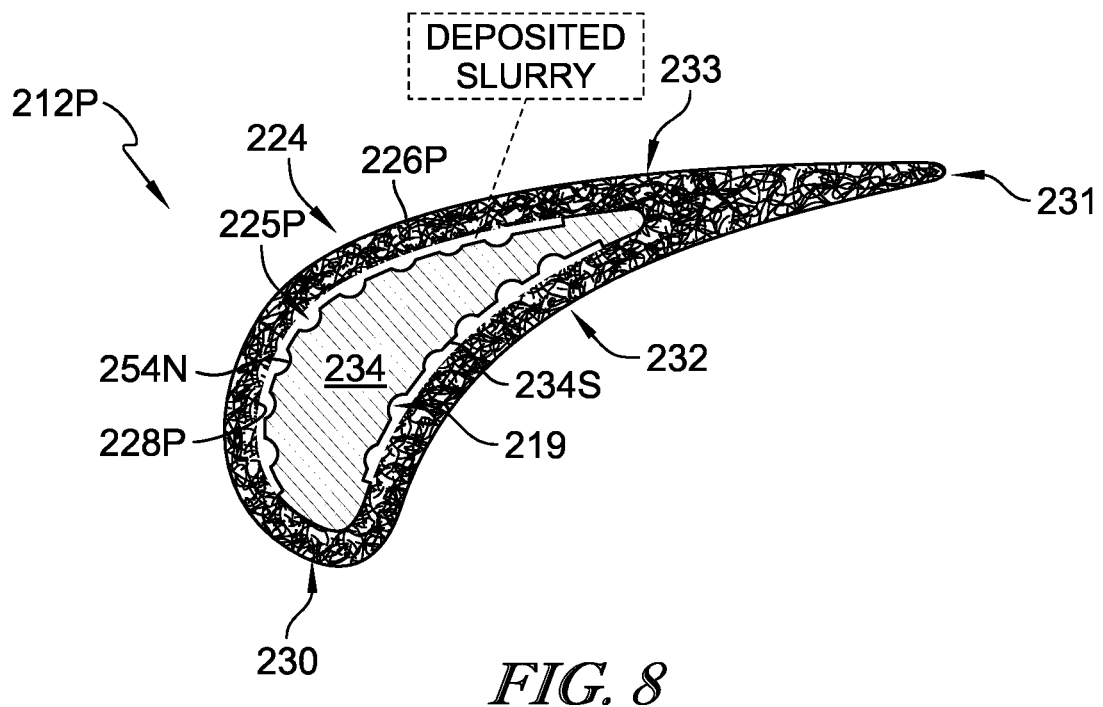
FIG. 8 is cross sectional view of the porous preform formed by the method of FIG. 7 showing a tool assembly inserted in a passageway of the porous preform to begin forming the plurality of protrusions by depositing the slurry material in a space defined between an interior surface of the preform and an outer surface of the tool assembly.
Figure 9:
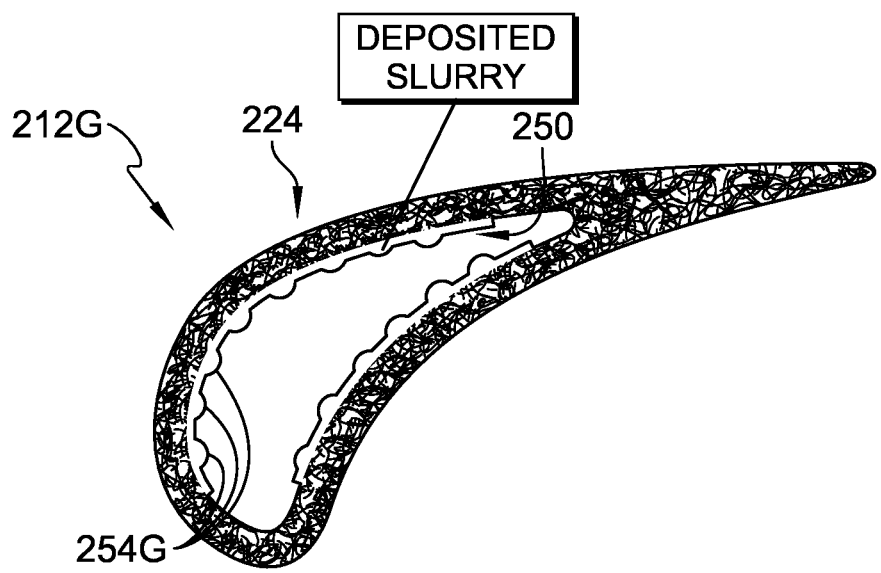
FIG. 9 is a cross sectional view of the perform of FIG. 8 showing the slurry material has been deposited in the space and allowed to dry to form a surface layer with the plurality of protrusions.

The present disclosure relates to the use of augmentation features 54 applied to the airfoil 24 features to increase the heat transfer coefficient at the CMC surface. The potential application zones are illustrated in FIGS. 2 and 8.

Features may be applied to the internal surface of the airfoil through the manufacturing process. For example, the slurry surface layer may be applied to produce these features, wherein the cast defines the negative of the three-dimensional surface features. Alternatively, patterns can be etched, machined or laser ablated into a uniformly cast surface.

Additionally, features such as radial ribs at the leading edge or chordal ribs along the airfoil surfaces can be produced to compartmentalise internal vane cooling system.

These features may be applied generally to the pressure and suction sides of the CMC airfoil. Alternatively, the features may be applied to discrete regions that require an increased level of cooling relative to the surrounding structure. The shape and density of the features can be tuned to affect heat transfer characteristics.

While the disclosure has been illustrated and described in detail end in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of forming a turbine vane, the method comprising
providing a fiber preform having a vane shape, the vane shape including outer and inner platforms spaced apart radially from one another relative to a central reference axis to define a primary gas path therebetween, an airfoil that extends from the outer platform to the inner platform across the primary gas path, and a passageway that extends radially through the outer platform, the inner platform, and the airfoil,
inserting a tool assembly into the passageway of the fiber preform, the tool assembly including a plurality of radial sections that cooperate to define negatives of protrusions that extend into an outer surface of the tool assembly,
chemical vapor infiltrating the fiber preform to produce a porous preform with a plurality of protrusions in the passageway,
removing the tool assembly from the passageway of the porous preform,
impregnating the porous preform with a slurry material,
drying the slurry material to form a green body preform, and
infiltrating the green body preform with a matrix material to form a ceramic matrix composite vane including a plurality of heat transfer augmentation features configured to increase heat transfer between the ceramic matrix composite vane and cooling air supplied to the passageway during use of the turbine vane in a gas turbine engine,
wherein at least one radial section of the plurality of radial sections includes a plurality of tool pieces and a core piece that are assembled together to form the at least one radial section, and
wherein the plurality of tool pieces confront the fiber preform in the passageway to define the negatives of the protrusions and the core piece is located in a center hole formed by the plurality of tool pieces.

2. The method of claim 1, wherein the plurality of protrusions are spaced apart radially at radial locations between the outer and inner platforms along the primary gas path.

3. The method of claim 2, wherein the airfoil is shaped to define a leading edge, a trailing edge spaced apart axially from the leading edge, a pressure side, and a suction side spaced apart circumferentially from the pressure side, the pressure side and the suction side extend between and interconnect the leading edge and the trailing edge, and wherein the plurality of protrusions are formed along at least one of the pressure side and the suction side of the airfoil.

4. The method of claim 3, wherein the plurality of protrusions are located only along the pressure side of the airfoil.

5. The method of claim 3, wherein the plurality of protrusions are located only along the suction side of the airfoil.

6. The method of claim 1, wherein removing the tool assembly includes disassembling the at least one radial section of the plurality of radial sections by removing the core piece before removing the plurality of tool pieces to allow the plurality of tool pieces to be removed.

7. The method of claim 1, wherein more than one radial section of the plurality of radial sections each includes the plurality of tool pieces and the core piece.

8. The method of claim 7, wherein the core piece of one radial section included in the plurality of radial sections is greater in size than the center piece of an adjacent radial section included in the plurality of radial sections.

9. The method of claim 7, wherein the plurality of tool pieces of a first radial section and the plurality of tool pieces of a second radial section adjacent to the first radial section define a first set of negatives of protrusions at a first radial location, and wherein the plurality of tool pieces of the second radial section and the plurality of tool pieces of a third radial section adjacent to the second radial section define a second set of negatives of protrusions at a second radial location spaced apart radially from the first radial location.

10. The method of claim 1, wherein the core piece of the at least one radial section has a triangular cross-section when viewed radially.

11. A method of forming a turbine vane, the method comprising
- providing a fiber preform having a vane shape, the vane shape including outer and inner platforms spaced apart radially from one another relative to a central reference axis to define a primary gas path therebetween, an airfoil that extends from the outer platform to the inner platform across the primary gas path, and a passageway that extends radially through the outer platform, the inner platform, and the airfoil,
- inserting a tool assembly into the passageway of the fiber preform, the tool assembly including a plurality of radial sections that cooperate to define negatives of protrusions that extend into an outer surface of the tool assembly,
- chemical vapor infiltrating the fiber preform to produce a porous preform with a plurality of protrusions in the passageway,
- removing the tool assembly from the passageway of the porous preform,
- impregnating the porous preform with a slurry material,
- drying the slurry material to form a green body preform, and
- infiltrating the green body preform with a matrix material to form a ceramic matrix composite vane including a plurality of heat transfer augmentation features configured to increase heat transfer between the ceramic matrix composite vane and cooling air supplied to the passageway during use of the turbine vane in a gas turbine engine,
- wherein the plurality of radial sections includes a first end section located at an outer radial end of the airfoil, a second end section spaced apart radially from the first end section and located at an inner radial end of the airfoil, and a plurality of intermediate sections located radially between the first end section and the second end section, and
- wherein each intermediate section of the plurality of intermediate sections includes a plurality of tool pieces that confront the fiber preform in the passageway to define the negatives of the protrusions when assembled in the passageway and a center piece located in a center hole formed by the plurality of tool pieces when assembled in the passageway.

12. The method of claim 11, wherein the first end section and the second end section are each a single piece.

13. The method of claim 11, wherein the plurality of protrusions are spaced apart radially at radial locations between the outer and inner platforms along the primary gas path.

14. The method of claim 11, wherein removing the tool assembly includes disassembling each intermediate section of the plurality of intermediate sections by removing the center piece before removing the plurality of tool pieces to allow the plurality of tool pieces to be removed.

15. The method of claim 11, wherein the center piece of one intermediate section of the plurality of intermediate sections is greater in size than the center piece of an adjacent intermediate section of the plurality of intermediate sections.

16. The method of claim 11, wherein the center piece of the at least one radial section has a triangular cross-section when viewed radially.

* * * * *